(12) United States Patent
Agapiou et al.

(10) Patent No.: US 10,958,144 B2
(45) Date of Patent: Mar. 23, 2021

(54) METHOD OF MANUFACTURING AN INDUCTION ROTOR

(71) Applicant: GM Global Technology Operations LLC, Detroit, MI (US)

(72) Inventors: John S. Agapiou, Rochester Hills, MI (US); Thomas A. Perry, Bruce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 16/141,281

(22) Filed: Sep. 25, 2018

(65) Prior Publication Data

US 2020/0099280 A1 Mar. 26, 2020

(51) Int. Cl.
| | |
|---|---|
| *H02K 15/02* | (2006.01) |
| *H02K 15/09* | (2006.01) |
| *H02K 15/00* | (2006.01) |
| *H02K 17/28* | (2006.01) |
| *H02K 3/04* | (2006.01) |

(52) U.S. Cl.
CPC ............... *H02K 15/09* (2013.01); *H02K 3/04* (2013.01); *H02K 15/0012* (2013.01); *H02K 15/02* (2013.01); *H02K 17/28* (2013.01); *Y10T 29/49012* (2015.01)

(58) Field of Classification Search
USPC ............... 29/598, 596, 604, 609, 732, 738
See application file for complete search history.

(56) References Cited

U.S. PATENT DOCUMENTS

| | | | |
|---|---|---|---|
| 8,312,914 B2 | 11/2012 | Walker et al. | |
| 8,347,485 B2 | 1/2013 | Biederman et al. | |
| 8,643,241 B2 | 2/2014 | Kleber et al. | |
| 8,910,371 B2 | 12/2014 | Kleber et al. | |
| 9,083,221 B2 | 7/2015 | Kieber et al. | |
| 9,397,539 B2 | 7/2016 | Kleber et al. | |
| 10,680,502 B2 * | 6/2020 | Powell | H02K 1/246 |
| 2020/0220439 A1 * | 7/2020 | Sigmar | H02K 5/02 |

* cited by examiner

*Primary Examiner* — Thiem D Phan

(57) ABSTRACT

A method for manufacturing an induction rotor includes placing a lamination stack into a fixture in which the first end of the lamination stack is rotated in an opposite rotational direction from the second end of the lamination stack to skew the conduction bars to an angle α. Vertical members are fixed to an outer perimeter of each of the plurality of laminates of the lamination stack. Hoop members are fixed to each of the plurality of vertical members and an outer edge of each of the plurality of conduction bars. A conduction ring is fixed on each of the ends of the lamination stack. An outer perimeter of the lamination stack is machined to remove the plurality of vertical members and the plurality of hoop members from the lamination stack.

15 Claims, 6 Drawing Sheets

METHOD OF MANUFACTURING AN INDUCTION ROTOR

INTRODUCTION

The present disclosure relates generally to the manufacture of induction-type electric motors, and more particularly to a method of manufacturing induction rotors.

Development of induction rotors for use in induction-type electric motors has found that including conduction bars that have a skew angle or angle relative to the rotating axle of the motor can be beneficial for proper and consistent torque output from the motor. However, traditional manufacturing processes have not been able to first, consistently set the skew angle in the induction rotor and second, maintain the skew angle after the manufacturing process is complete. Due to stress relaxation after casting or joining the induction rotor, significant skew angle variation is found as a result.

Accordingly, there is a need in the art for an improved process for manufacturing induction rotors having minimal skew angle variation that extends for the life of the induction motor in service.

SUMMARY

The present disclosure comprises a method for manufacturing an induction rotor. The method includes providing a lamination stack having a plurality of laminates and a plurality of conduction bars. The lamination stack has a first end and a second end opposite the first end. A retainer ring is installed on each of the first end and the second end of the lamination stack. The lamination stack is placed into a fixture. The first end of the lamination stack is rotated in an opposite rotational direction from the second end of the lamination stack to skew the conduction bars to an angle α. A plurality of vertical members are fixed to an outer perimeter of each of the plurality of laminates of the lamination stack. A plurality of hoop members are fixed to each of the plurality of vertical members and an outer edge of each of the plurality of conduction bars. A conduction ring is fixed on each of the first end and the second end of the lamination stack. An outer perimeter of the lamination stack is machined to remove the plurality of vertical members and the plurality of hoop members from the lamination stack.

In one example of the present disclosure, the lamination stack is provided having each of the laminates of the plurality of laminates include a plurality of slots equally spaced on an outside perimeter of the laminates forming a plurality of elongated grooves and one of the plurality of conduction bars are disposed in each of the elongated grooves of the plurality of elongated grooves.

In another example of the present disclosure, the retainer ring is installed in a groove formed by a notch on an inner edge of each of the plurality of conduction bars on each of the first end and the second end of the lamination stack.

In yet another example of the present disclosure, the retainer ring is installed in a groove formed by a notch on an outer edge of each of the plurality of conduction bars on each of the first end and the second end of the lamination stack.

In yet another example of the present disclosure, the plurality of vertical members are welded to the outer perimeter of the plurality of laminates of the lamination stack.

In yet another example of the present disclosure, the plurality of hoop members are welded to the plurality of vertical members and the outer edge of the plurality of conduction bars.

In yet another example of the present disclosure, the conduction rings are fixed on each of the first end and the second end of the lamination stack by forming a conduction ring on each of the first end and the second end of the lamination stack by an over mold casting process.

In yet another example of the present disclosure, the conduction ring is fixed on each of the first end and the second end of the lamination stack by one of welding and brazing the conduction ring on each of the first end and the second end of the lamination stack.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
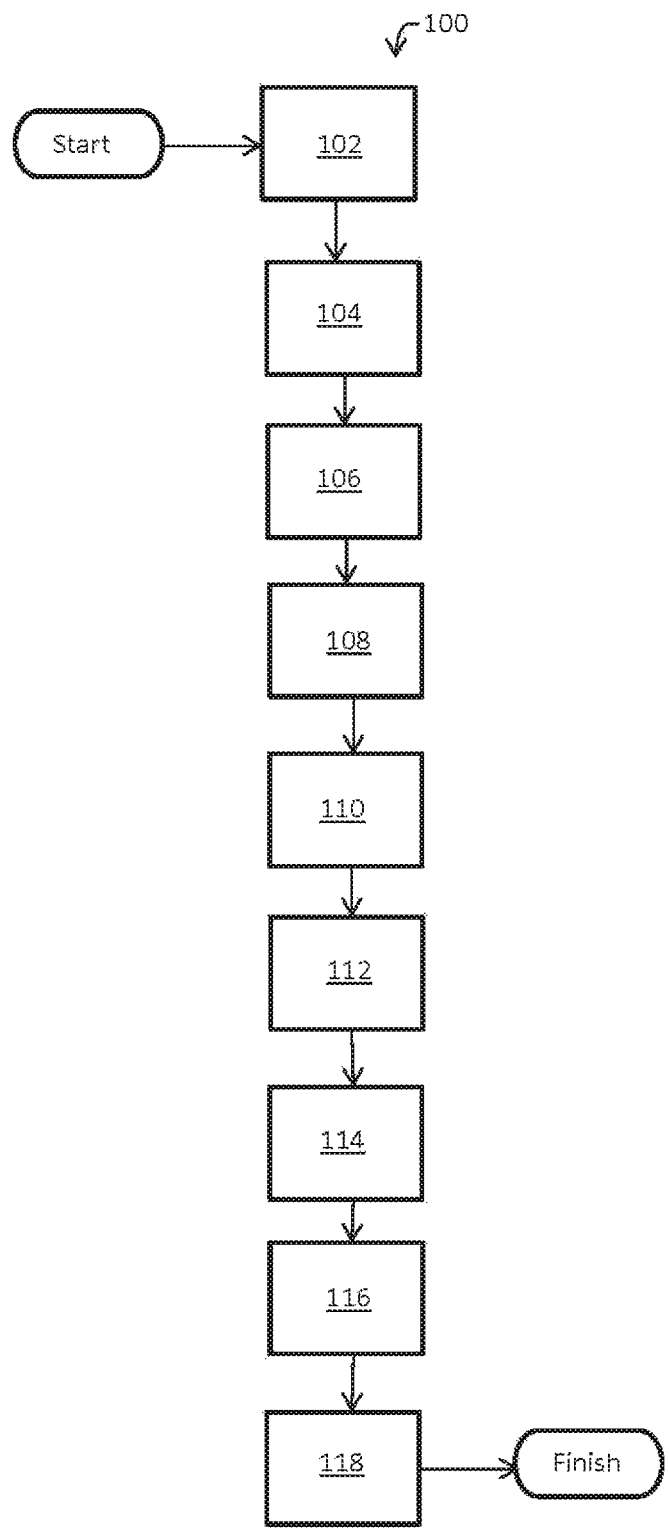
FIG. 1 is a flow chart detailing a method of manufacturing induction rotors according to the principles of the present disclosure.
Figure 2:
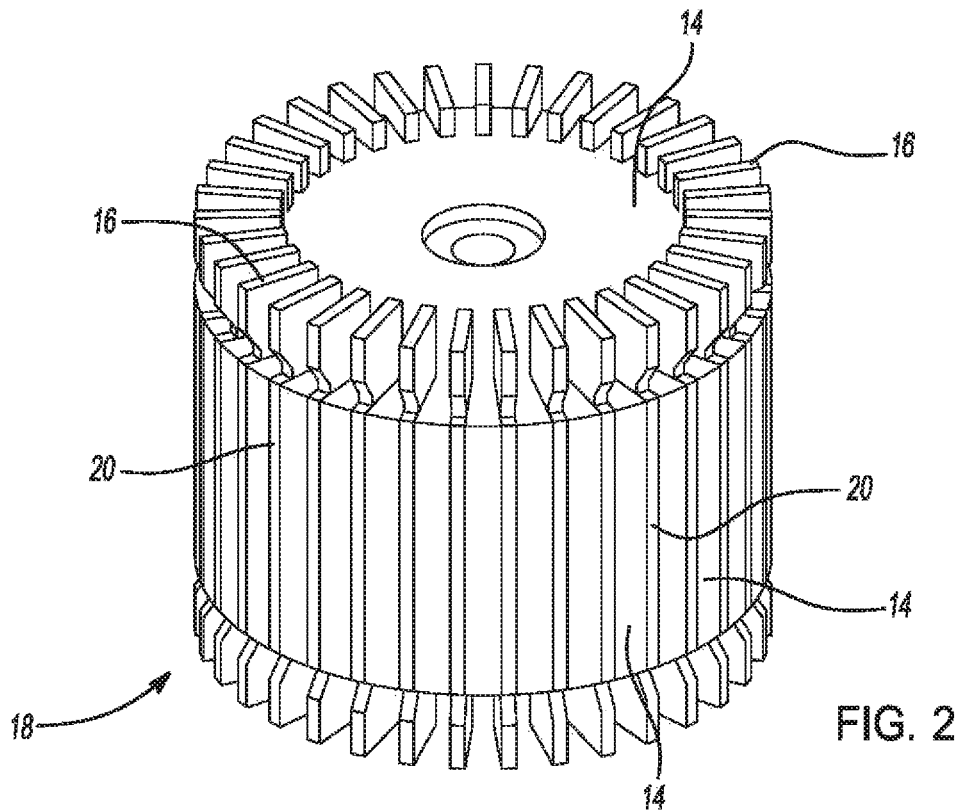
FIG. 2 is a perspective view of a partially assembled induction rotor according to the principles of the present disclosure.
Figure 3A:
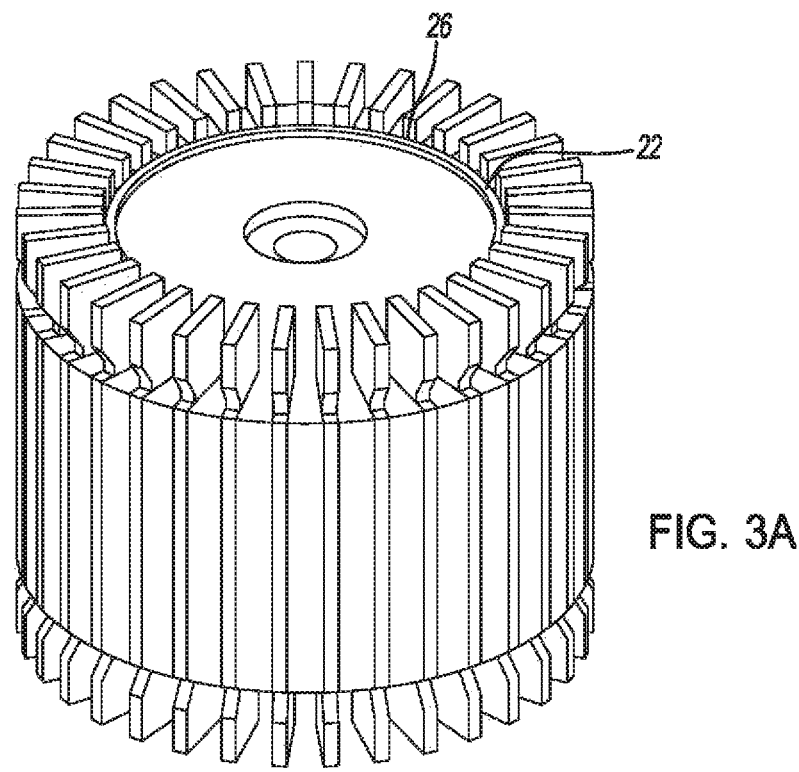
FIG. 3A is a perspective view of a partially assembled induction rotor according to the principles of the present disclosure.
Figure 3B:
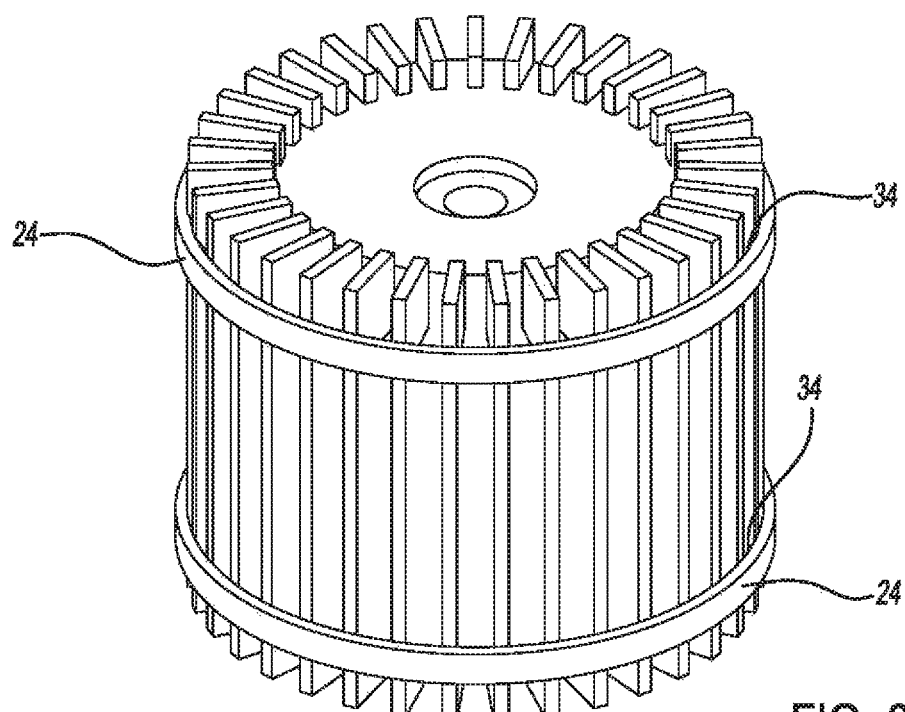
FIG. 3B is a perspective view of a partially assembled induction rotor according to the principles of the present disclosure.
Figures 4A, 4B:
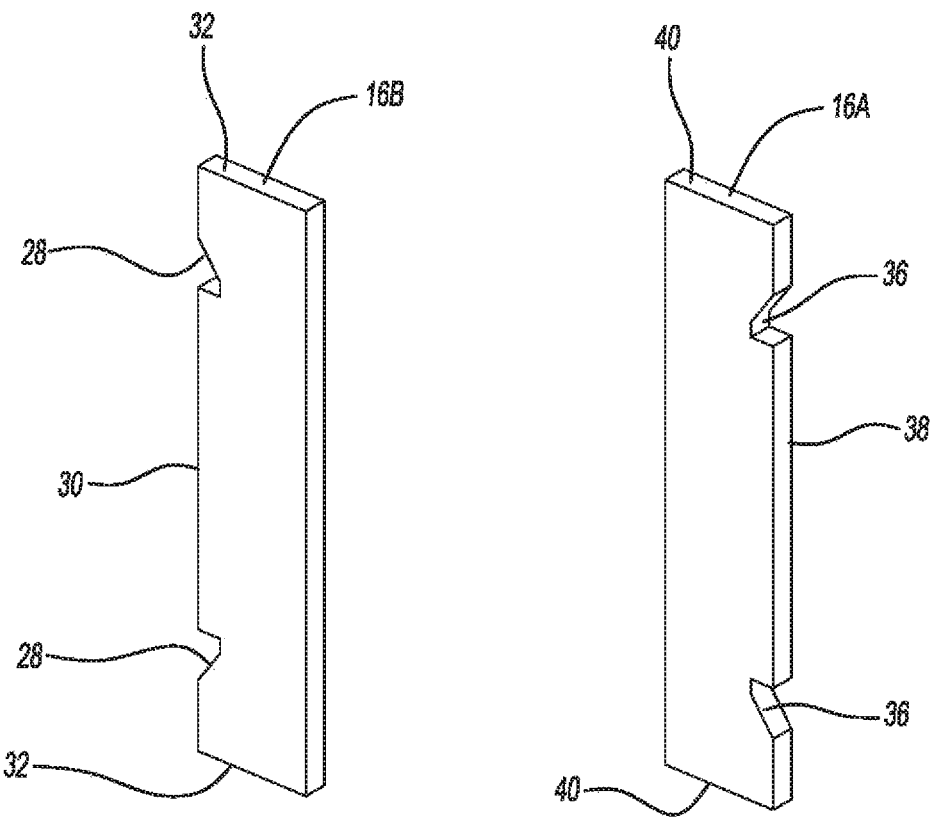
FIG. 4A is a side view of a conduction bar for an induction rotor according to the principles of the present disclosure.
FIG. 4B is a side view of a conduction bar for an induction rotor according to the principles of the present disclosure.

Examples of the present disclosure advantageously provide method of manufacturing an induction rotor for an induction style electric motor. Referring to the drawings, wherein like reference numbers refer to like components, FIG. 1 is a flow chart depicting the steps of a method 100 for manufacturing an induction rotor according the principles of the present disclosure. The method 100 will now be described using the flow chart of FIG. 1 in coordination with FIGS. 2-10 which illustrate various stages of assembly of the induction rotor after particular steps of the method 100. For example, the first step 102 of the method 100 includes assembling a plurality of laminates 14 with a plurality of conduction bars 16 as shown in FIG. 2. More particularly, the plurality of laminates 14 are formed into a lamination stack 18 which includes slots 20 in which are disposed one of the plurality of conduction bars 16. The conduction bars 16 are spaced equally about the perimeter of the lamination stack 18.

Referring now to FIGS. 3A, 3B, 4A, and 4B with continuing reference to FIG. 1, in a second step 104 of the method 100 the lamination stack 18 and conduction bars 16 are secured together in a rotor assembly using one of a first retainer ring 22 and a second retainer ring 24. The first retainer ring 22 is disposed in a groove 26 formed by a plurality of conduction bars 16B having a first notch 28 on the inner edge 30 of the conduction bar 16B proximate each of the ends 32 of the conduction bars 16B. The first notches 28 of the plurality of conduction bars 16B align to form the groove 26 when assembled with the lamination stack 18.

Alternatively, the second retainer ring 24 is disposed in a groove 34 formed by a plurality of conduction bars 16A having a second notch 36 on the outer edge 38 of the conduction bar 16A proximate each of the ends 40 of the conduction bars 16A. The second notches 36 of the plurality of conduction bars 16A align to form the groove 34 when assembled with the lamination stack 18.

Figure 5:
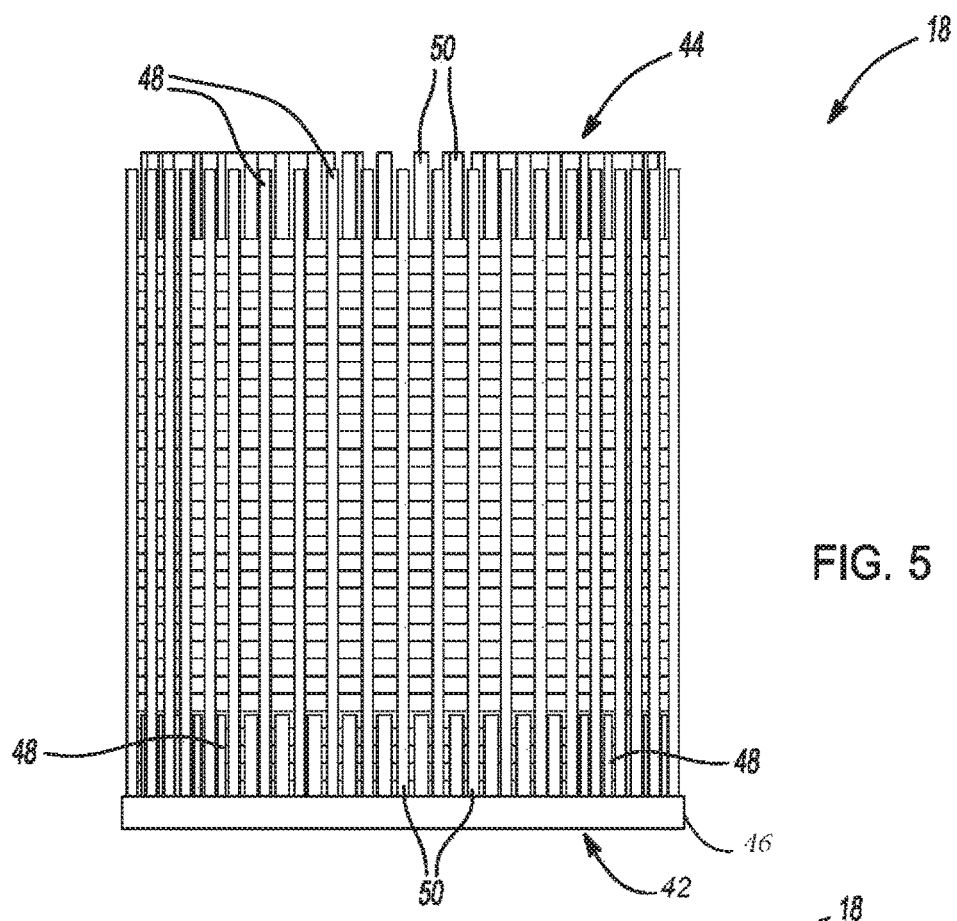
FIG. 5 is a perspective view of a partially assembled induction rotor held in a manufacturing fixture according to the principles of the present disclosure.
Figure 6:
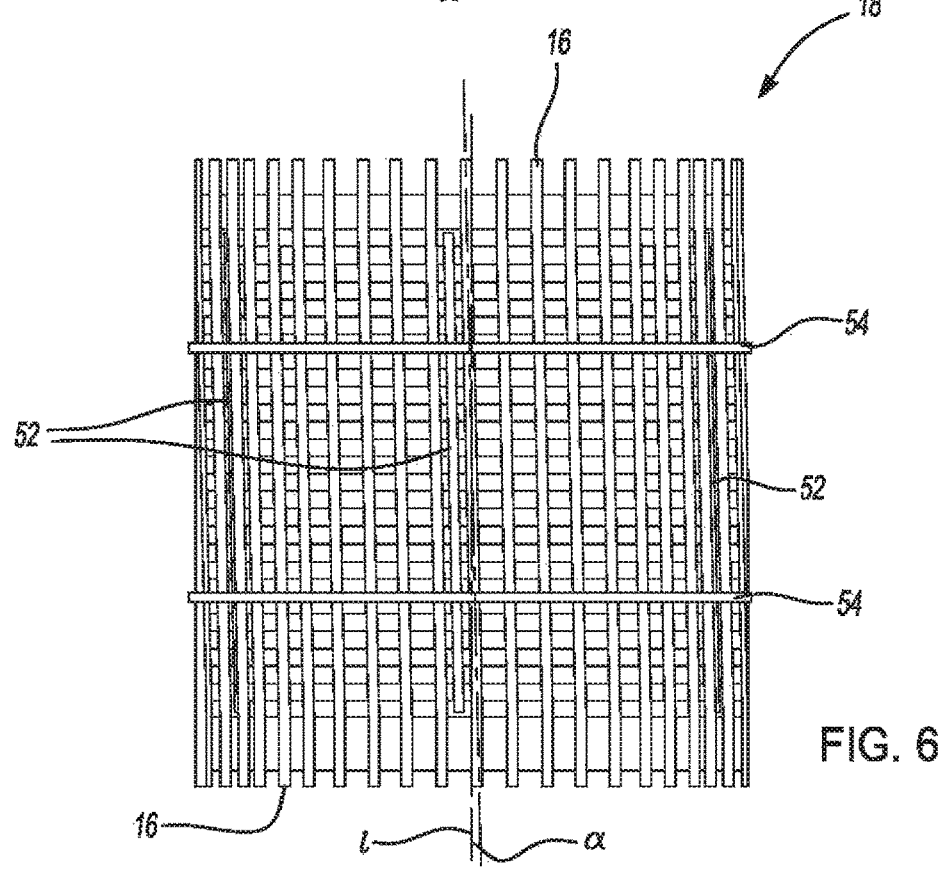
FIG. 6 is a perspective view of a partially assembled induction rotor according to the principles of the present disclosure.

A third step 106 of the method 100 places the assembled lamination stack 18 into a fixture 42 as shown in FIG. 5. The fixture 42 includes an upper portion 44 and a lower portion 46 each having a plurality of radially extending members 48 disposed in the gaps 50 formed between the ends 32, 40 of the conduction bars 16. A fourth step 108 of the method 100 sets the skew angle α of the conduction bars 16 relative to the rotational axis i of the lamination stack 18 (as shown in FIG. 6). The upper portion 44 of the fixture 42 rotates in the opposite direction from the lower portion 46 of the fixture 42.

Figure 7:
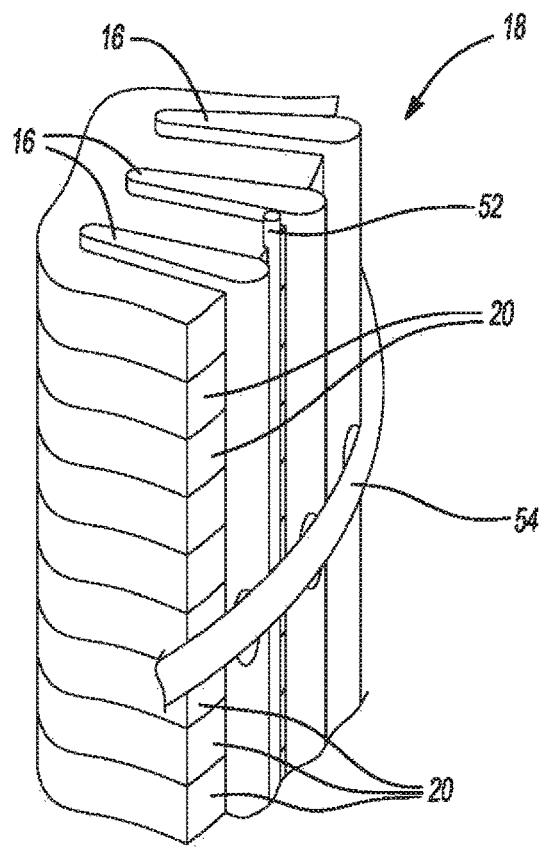
FIG. 7 is a partial perspective view of a partially assembled induction rotor according to the principles of the present disclosure.

A fifth step 110 of the method 100 fixes a vertical member 52 to the individual laminates of the lamination stack 18. The vertical member 52 is preferably welded to the laminates 14, however other means of fixing the vertical member 52 to the laminates 14 may be considered without departing from the scope of the disclosure. For example, the vertical members 52 may be adhered to the laminates 14 using an adhesive or other type of metal joining technique. In this fifth step 110, several vertical members 52 are joined to the lamination stack 18 around the perimeter of the lamination stack 18. The result of this fifth step is shown in FIG. 7. While FIG. 7 illustrates the conduction bars A sixth step 112 of the method 100 fixes a plurality of hoop members 54 to the vertical members 52 and conduction bars 16. Again, the preferred metal joining technique in the sixth step 112 is welding. Referring back to FIG. 6, two hoop members 54 are used to permanently hold the lamination stack 18 and conduction bars 16 to the skew angle α set by the fixture 44, however additional or fewer hoop members 54 may be fixed to the vertical members 52 and conduction bars 16 without departing from the scope of the disclosure so long as the result of the sixth step 112 is a permanently set skew angle α. While FIG. 7 illustrates the outer edge 38 of the conduction bar 16 extends beyond the outer perimeter of the lamination stack 18, the disclosure contemplates that the outer edge 38 of the conduction bars 16 may be just below the outer perimeter of the lamination stack 18 without departing from the scope of the disclosure.

Figure 8:
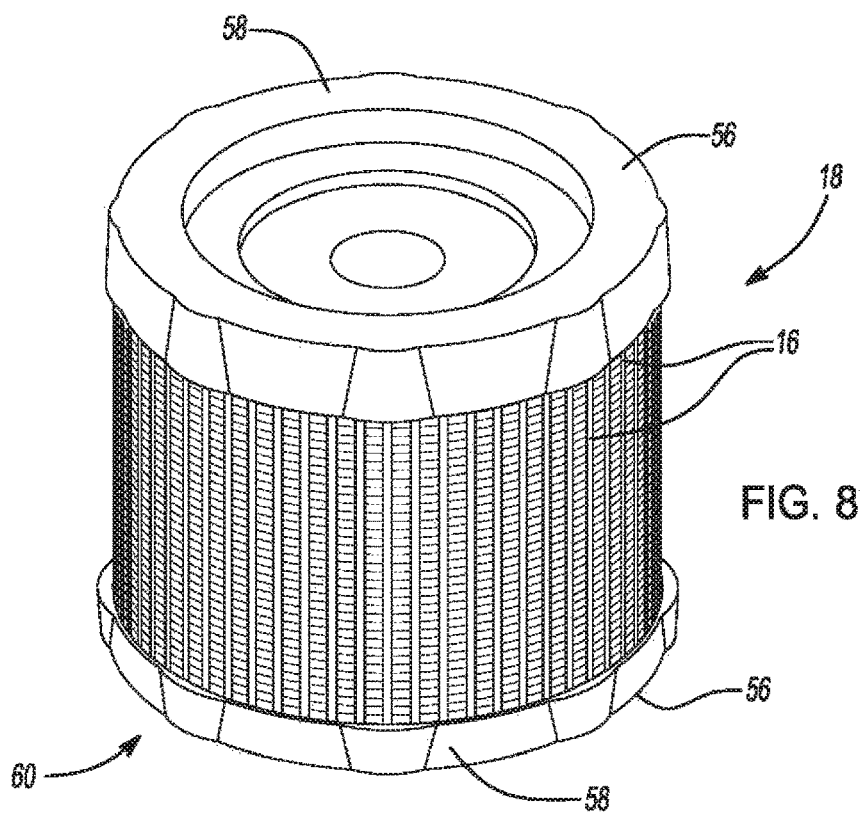
FIG. 8 is a perspective view of an induction rotor according to the principles of the present disclosure.
Figure 9:
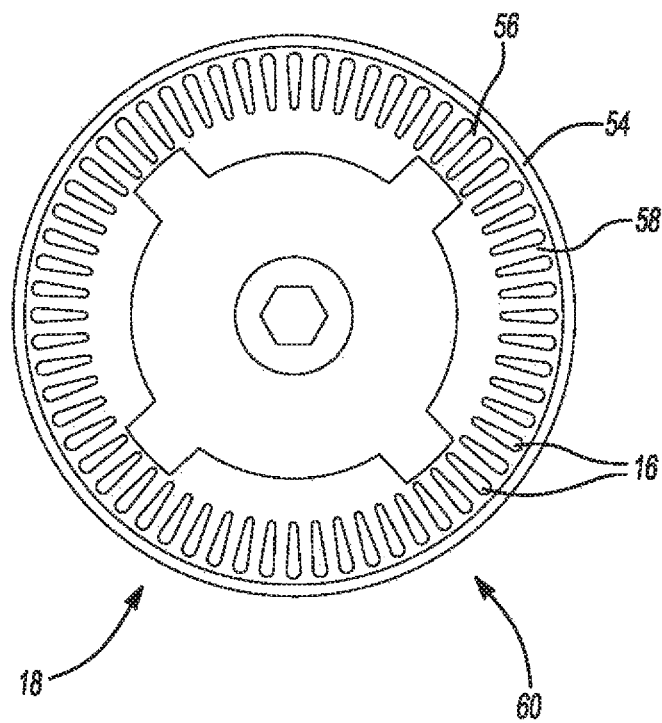
FIG. 9 is a top view of an induction rotor according to the principles of the present disclosure.
Figure 10:
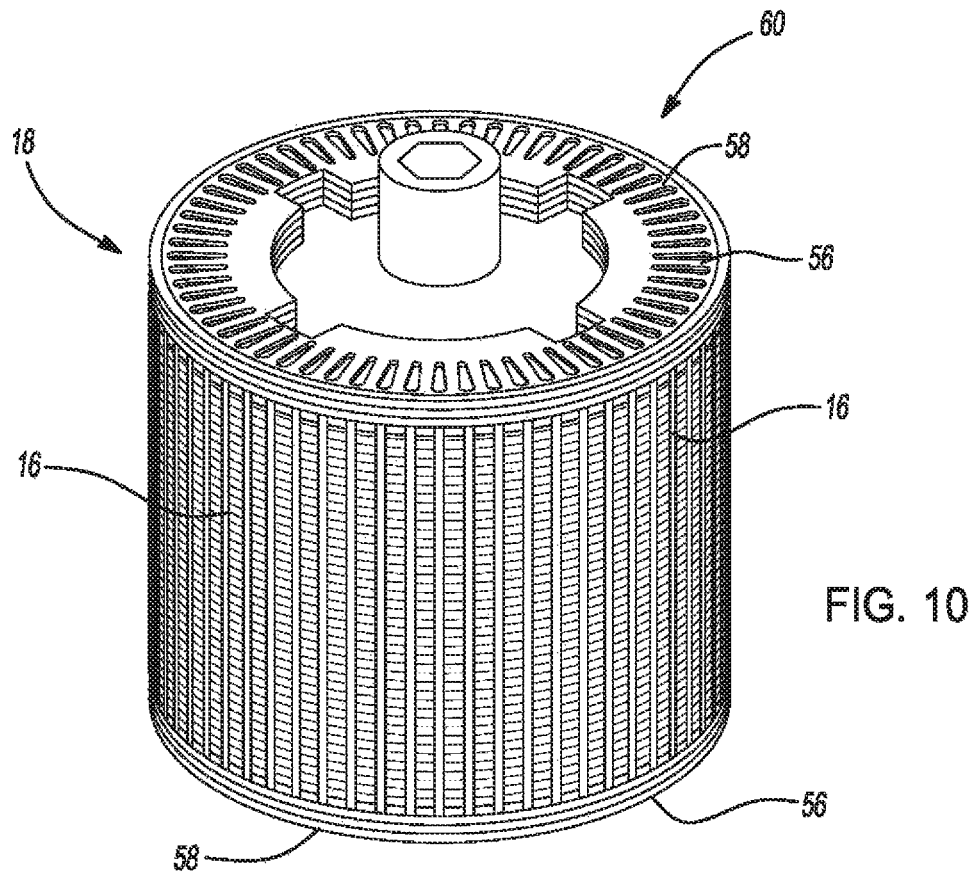
FIG. 10 is a perspective view of an induction rotor according to the principles of the present disclosure.

The seventh step 114 of the method 100 removes the lamination stack 18 with the permanently set skew angle α from the fixture 44 and prepares the lamination stack 18 to go through the eighth step 116 of installing conduction rings 56 on each end 58 of the lamination stack 18. For the eighth step 116 of the method 100, of several techniques that may be used to install or form the conduction rings 56 on the lamination stack 18, those considered in the present method 100 include brazing or welding the conduction rings 56 on the ends of the conduction bars 16 (as shown in FIGS. 9 and 10) or casting the conduction rings 56 in place using an over mold casting process (as shown in FIG. 8). The over mold casting process includes placing the lamination stack 18 in a mold or die and pouring a metal alloy, preferably an aluminum alloy, into the mold such that the conduction rings 56 solidify in place at each end 58 of the lamination stack 18.

Regardless of the technique used to install or form the conduction rings 56 on the lamination stack 18, the ninth step 118 of the method includes removing the vertical members 52 and the hoop members 54 from the completed induction rotor assembly 60. A machining technique may be used to separate the vertical members 52 and the hoop members 54 which also may remove other material from the outer perimeter 62 of the induction rotor assembly 60 to achieve a specified dimension.

While examples have been described in detail, those familiar with the art to which this disclosure relates will recognize various alternative designs and examples for practicing the disclosed structure within the scope of the appended claims.

The invention claimed is:

1. A method for manufacturing an induction rotor, the method comprising:
   providing a lamination stack comprising a plurality of laminates and a plurality of conduction bars, the lamination stack having a first end and a second end opposite the first end;
   installing a retainer ring on each of the first end and the second end of the lamination stack;
   placing the lamination stack into a fixture;
   rotating the first end of the lamination stack in an opposite rotational direction from the second end of the lamination stack to skew the conduction bars to an angle α;
   fixing a plurality of vertical members to a first outer perimeter of each of the plurality of laminates of the lamination stack;
   fixing a plurality of hoop members to each of the plurality of vertical members and an outer edge of each of the plurality of conduction bars;
   fixing a conduction ring on each of the first end and the second end of the lamination stack;
   machining a second outer perimeter of the lamination stack to remove the plurality of vertical members and the plurality of hoop members from the lamination stack.

2. The method of claim 1 wherein providing the lamination stack comprising the plurality of laminates and the plurality of conduction bars, the lamination stack having the first end and the second end opposite the first end further comprises providing the lamination stack comprising the plurality of laminates and the plurality of conduction bars, the lamination stack having the first end and the second end opposite the first end, and wherein each of the laminates of the plurality of laminates include a plurality of slots equally spaced on an outside perimeter of the laminates forming a plurality of elongated grooves and one of the plurality of conduction bars are disposed in each of the elongated grooves of the plurality of elongated grooves.

3. The method of claim 1 wherein installing the retainer ring on each of the first end and the second end of the lamination stack further comprises installing the retainer ring in a groove formed by a notch on an inner edge of each of the plurality of conduction bars on each of the first end and the second end of the lamination stack.

4. The method of claim 1 wherein installing the retainer ring on each of the first end and the second end of the lamination stack further comprises installing the retainer ring in a groove formed by a notch on an outer edge of each of the plurality of conduction bars on each of the first end and the second end of the lamination stack.

5. The method of claim 1 wherein fixing the plurality of vertical members to the outer perimeter of the plurality of laminates of the lamination stack further comprises fixing the plurality of vertical members to the outer perimeter of the plurality of laminates of the lamination stack by welding.

6. The method of claim 1 wherein fixing the plurality of hoop members to the plurality of vertical members and the outer edge of the plurality of conduction bars further comprises fixing the plurality of hoop members to the plurality of vertical members and the outer edge of the plurality of conduction bars by welding.

7. The method of claim 1 wherein fixing the conduction ring on each of the first end and the second end of the lamination stack further comprises fixing the conduction ring on each of the first end and the second end of the lamination stack by forming the conduction ring on each of the first end and the second end of the lamination stack by an over mold casting process.

8. The method of claim 1 wherein fixing the conduction ring on each of the first end and the second end of the lamination stack further comprises fixing the conduction ring on each of the first end and the second end of the lamination stack by one of welding and brazing the conduction ring on each of the first end and the second end of the lamination stack.

9. A method for manufacturing an induction rotor, the method comprising:
   providing a lamination stack comprising a plurality of laminates and a plurality of conduction bars, the lamination stack having a first end and a second end opposite the first end, and wherein each of the laminates of the plurality of laminates include a plurality of slots equally spaced on an outside perimeter of the laminates forming a plurality of elongated grooves and one of the plurality of conduction bars are disposed in each of the elongated grooves of the plurality of elongated grooves;
   installing a retainer ring on each of the first end and the second end of the lamination stack;
   placing the lamination stack into a fixture;
   rotating the first end of the lamination stack in an opposite rotational direction from the second end of the lamination stack to skew the conduction bars to an angle $\alpha$;
   fixing a plurality of vertical members to a first outer perimeter of each of the plurality of laminates of the lamination stack;
   fixing a plurality of hoop members to each of the plurality of vertical members and an outer edge of each of the plurality of conduction bars;
   fixing a conduction ring on each of the first end and the second end of the lamination stack;
   machining a second outer perimeter of the lamination stack to remove the plurality of vertical members and the plurality of hoop members from the lamination stack.

10. The method of claim 9 wherein installing the retainer ring on each of the first end and the second end of the lamination stack further comprises installing the retainer ring in a groove formed by a notch on an inner edge of each of the plurality of conduction bars on each of the first end and the second end of the lamination stack.

11. The method of claim 9 wherein installing the retainer ring on each of the first end and the second end of the lamination stack further comprises installing the retainer ring in a groove formed by a notch on an outer edge of each of the plurality of conduction bars on each of the first end and the second end of the lamination stack.

12. The method of claim 9 wherein fixing the plurality of vertical members to the outer perimeter of the plurality of laminates of the lamination stack further comprises fixing the plurality of vertical members to the outer perimeter of the plurality of laminates of the lamination stack by welding.

13. The method of claim 12 wherein fixing the plurality of hoop members to the plurality of vertical members and the outer edge of the plurality of conduction bars further comprises fixing the plurality of hoop members to the plurality of vertical members and the outer edge of the plurality of conduction bars by welding.

14. The method of claim 13 wherein fixing the conduction ring on each of the first end and the second end of the lamination stack further comprises fixing the conduction ring on each of the first end and the second end of the lamination stack by forming the conduction ring on each of the first end and the second end of the lamination stack by an over mold casting process.

15. The method of claim 13 wherein fixing the conduction ring on each of the first end and the second end of the lamination stack further comprises fixing the conduction ring on each of the first end and the second end of the lamination stack by one of welding and brazing the conduction ring on each of the first end and the second end of the lamination stack.

* * * * *